United States Patent Office 3,247,056
Patented Apr. 19, 1966

3,247,056
METHODS FOR INHIBITING BACTERIA, FUNGI AND NEMATODES WITH 1,3,2-DITHIOARSENOLS
Peter F. Epstein, El Cerrito, Calif., assignor to Stauffer Chemical Company, New York, N.Y., a corporation of Delaware
No Drawing. Filed Nov. 15, 1963, Ser. No. 323,905
5 Claims. (Cl. 167—30)

This invention relates to certain compounds which may be used as bactericides, fungicides and nematocides. More specifically, the invention relates to the use of compounds of the general formula

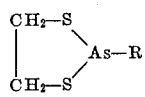

wherein R is selected from the group consisting of chlorine, lower thioalkanoic acids and lower alkyl thioalkanoates.

The compounds of the present invention are known. The preparation thereof is described by Ruggeberg, Ginsburg and Cook in J. Am. Chem. Soc. 68, 1860 (1946). Compound numbers have been assigned to each compound and are used throughout the balance of the application.

Compound No.:                Name
1 _____ 4,5 - dihydro - 1,3,2 - dithioarsenol-2-yl chloride.
2 _____ S - (4,5 - dihydro - 1,3,2 - dithioarsenol-2-yl)-thioethanoic acid.
3 _____ S - (4,5 - dihydro - 1,3,2 - dithioarsenol - 2 - yl) - β - thiopropanoic acid.
4 _____ n-Propyl S-(4,5-dihydro-1,3,2-dithioarsenol - 2 - yl) - β - thiopropanoate.

In the article noted above Ruggeberg et al. indicate the use of the above mentioned compounds as insecticides. It has now been found that these compounds are very effective as fungicides, bactericides and nematocides. The compounds have been tested and found active as the following typical tests show.

The compounds were tested against growing fungi and bacteria in an artificial medium. Fungi and bacteria are tested in vitro starting with three 1-ounce vials partially filled, two (2) with malt broth and one (1) with nutrient broth. The compound to be tested is placed in the vials at any desired concentration (expressed in parts per million) and mixed with the broth. The vials are inoculated with a water suspension of spores of the desired fungi and cells of the bacteria (one organism per vial). The bottles are then sealed and held for one week, after which time the results are observed and noted. The following data were obtained in this manner.

TABLE 1

In vitro vial test

| Compound No. | Concentration (p.p.m.) which allowed no growth | | |
|---|---|---|---|
| | Aspergillus niger | Penicillium sp. | Escherichia coli |
| 1 | 5 | 5 | 5 |
| 2 | 5 | 5 | 5 |
| 3 | 10 | 10 | 10 |
| 4 | 5 | 5 | 10 |

In the soil fungicide incorporation test, activity of a compound is determined against soil-borne pathogenic fungi. Two fungi are used and tested separately, Rhizoctonia solani and Fusarium solani. Each fungus is added to separate amounts of soil and then 1-pound portions are placed in quart jars. The chemical to be tested is pipetted into the fungus infested soil at a rate of 110 p.p.m., mixed thoroughly, and then placed in a paper container. Cotton is planted into Rhizoctonia solani-infested and treated soil. Beans are planted into Fusarium solani-infested and treated soil. Three to four weeks later the plants are inspected for disease symptoms. The lowest concentrations which prevent development of disease symptoms are reported. The following results were obtained with the compounds of this invention.

TABLE 2

Soil fungicide test

| Compound No. | Concentration (p.p.m.) which allowed no fungus growth | |
|---|---|---|
| | Rhizoctonia solani | Fusarium solani |
| 1 | >110 | 110 |
| 2 | >110 | 110 |
| 4 | >110 | 110 |

In the soil nematocide test, the methods used are similar to those used for the soil fungicide test except that root knot nematodes are used. The chemically treated soil is sealed for 48 hours and then is placed in paper contaners. The soil is allowed to stand in the greenhouse one week for airing after which a tomato plant is transplanted into it. The root knot nematodes attack the tomato plant roots if they survive the chemical treatment and cause swelling or knots on the roots. Four weeks after treatment the plant is removed from the soil and the roots inspected. The lowest concentration which prevented nematode development is recorded. The results are set forth in Table 3 below:

TABLE 3

Soil nematocide test

| Compound No. | Concentration (p.p.m.) which allowed no Nematode development |
|---|---|
| 1 | >110 |
| 2 | >110 |
| 3 | 110 |

In the foliage fungicide test, pinto bean plants are sprayed at 1000, 500 and 100 parts per million concentration of chemical dissolved or suspended in water and wetting agent. One thousand parts per million is approximately half the commonly recommended field rate for commercial application. After drying, the beans are inoculated with beam rust or corn leaf blight. Rust infection requires an overnight treatment in a mist chamber after inoculation. Results are recorded as 100 (complete control), ++++ (75 to 100% control), +++ (50 to 75% control), ++ (25 to 50% control) and 0

(no visible control). The following results were obtained:

TABLE 4
*Foliage fungicide test*

| Compound No. | Percent Control | | | | | |
|---|---|---|---|---|---|---|
| | Bean Rust | | | Corn Leaf Blight | | |
| | 1,000 | 500 | 100 | 1,000 | 500 | 100 |
| 1 | | | 100 | 100 | 100 | 75 |
| 2 | | 100 | 100 | 100 | 75 | 75 |
| 4 | | | 75 | | | |

Compounds of the present invention find particular utility as bactericides, fungicides and nematocides and may be applied in a variety of ways at various concentrations. They may be combined with suitable carriers and applied as dusts, sprays or drenches. The amount applied will depend on the nature of the utility. The rate of application may also vary with the microbiological use intended.

Various changes and modifications may be made without departing from the spirit and scope of the invention described herein as will be apparent to those skilled in the art to which it pertains. It is accordingly intended that the present invention shall only be limited by the scope of the appended claims.

I claim:
1. The method of inhibiting the growth of bacteria, fungi and nematodes, comprising applying thereto an effective amount of a compound

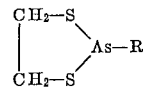

wherein R is a member selected from the group consisting of chlorine, lower thioalkanoic acids and lower alkyl ω-thioalkanoates.

2. A method of inhibiting the growth of bacteria, fungi and nematodes, comprising applying thereto an effective amount of 4,5-dihydro-1,3,2-dithioarsenol-2-yl chloride.

3. A method of inhibiting the growth of bacteria, fungi and nematodes, comprising applying thereto an effective amount of S-(4,5-dihydro-1,3,2-dithioarsenol-2-yl)-thioethanoic acid.

4. A method of inhibiting the growth of bacteria, fungi and nematodes, comprising applying thereto an effective amount of S - (4,5 - dihydro-1,3,2-dithioarsenol-2-yl)-β-thiopropanoic acid.

5. A method of inhibiting the growth of bacteria, fungi and nematodes, comprising applying thereto an effective amount of n-propyl S-(4,5-dihydro-1,3,2-dithioarsenol-2-yl)-β-thiopropanoate.

No references cited.

JULIAN S. LEVITT, *Primary Examiner*.